US009809099B2

(12) United States Patent
Itoga

(10) Patent No.: US 9,809,099 B2
(45) Date of Patent: Nov. 7, 2017

(54) FUEL CELL VEHICLE AND METHOD OF MOUNTING FUEL CELL STACK ON VEHICLE

(71) Applicant: TOYOTA JIDOSHA KABUSHIKI KAISHA, Toyota-shi, Aichi-ken (JP)

(72) Inventor: Michitaro Itoga, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/023,502

(22) PCT Filed: Sep. 29, 2014

(86) PCT No.: PCT/JP2014/004978
§ 371 (c)(1),
(2) Date: Mar. 21, 2016

(87) PCT Pub. No.: WO2015/049857
PCT Pub. Date: Apr. 9, 2015

(65) Prior Publication Data
US 2016/0207387 A1    Jul. 21, 2016

(30) Foreign Application Priority Data

Oct. 4, 2013    (JP) .................................. 2013-208945

(51) Int. Cl.
*B60K 1/04*    (2006.01)
*H01M 8/2475*    (2016.01)
*B60L 11/18*    (2006.01)

(52) U.S. Cl.
CPC ............ *B60K 1/04* (2013.01); *B60L 11/1896* (2013.01); *H01M 8/2475* (2013.01); (Continued)

(58) Field of Classification Search
CPC ......... H01M 8/2475; B60K 2001/0411; B60L 11/1896; B60L 11/1898
See application file for complete search history.

(56) References Cited

U.S. PATENT DOCUMENTS 5,686,202 A * 11/1997 Hooke ................ H01M 2/0242
29/623.2
8,361,669 B2 * 1/2013 Niimi .................. B60L 11/1896
429/452

(Continued)

FOREIGN PATENT DOCUMENTS

| JP | 2005-231549 | 9/2005 |
| JP | 2006-226461 | 8/2006 |

(Continued)

*Primary Examiner* — Brian Swenson
(74) *Attorney, Agent, or Firm* — Finnegan, Henderson, Farabow, Garrett & Dunner, LLP

(57) ABSTRACT

A fuel cell vehicle which a fuel cell stack is mounted on comprises a stack case that is configured to place the fuel cell stack therein; mounts that are configured to fix the stack case to a vehicle body; ribs, each being provided to be extended from a position adjacent to the mount across an upper surface of the stack case; and a damping member that is provided between adjacent ribs on the upper surface of the stack case. The damping member is a material formed by applying an aluminum sheet on butyl rubber. This configuration reduces the noise and damps the vibration.

5 Claims, 3 Drawing Sheets

(52) U.S. Cl.
CPC ............... *B60K 2001/0411* (2013.01); *B60K 2001/0438* (2013.01); *H01M 2250/20* (2013.01); *Y02E 60/50* (2013.01); *Y02T 90/32* (2013.01)

(56) References Cited

U.S. PATENT DOCUMENTS

| | | | | |
|---|---|---|---|---|
| 8,673,467 | B2* | 3/2014 | Katano | B60K 1/04 180/65.31 |
| 8,932,769 | B2* | 1/2015 | Ohashi | B62D 25/20 180/65.31 |
| 9,172,100 | B2* | 10/2015 | Hotta | H01M 8/04029 |
| 9,254,873 | B2* | 2/2016 | Keller | B60K 1/04 |
| 2005/0282047 | A1* | 12/2005 | Kimura | H01M 8/04186 429/4 |
| 2007/0170790 | A1* | 7/2007 | Morishita | F04D 25/0613 310/51 |
| 2009/0130530 | A1* | 5/2009 | Tanaka | H01M 8/2475 429/515 |
| 2014/0322626 | A1* | 10/2014 | Naito | H01M 8/2475 429/467 |

FOREIGN PATENT DOCUMENTS

| | | |
|---|---|---|
| JP | 2008-111538 | 5/2008 |
| JP | 2011-129333 A | 6/2011 |
| JP | 2012-82949 | 4/2012 |
| JP | 2013-1343 | 1/2013 |
| JP | 2013-136308 | 7/2013 |

\* cited by examiner

FUEL CELL VEHICLE AND METHOD OF MOUNTING FUEL CELL STACK ON VEHICLE

CROSS-REFERENCE TO RELATED APPLICATIONS

This application is a national phase application of International Application No. PCT/JP2014/004978, filed Sep. 29, 2014, and claims the priority of Japanese Application No. 2013-208945, filed Oct. 4, 2013, the content of both of which is incorporated herein by reference.

TECHNICAL FIELD

The present invention relates to a fuel cell vehicle which a fuel cell stacked is mounted on, and a method of mounting the fuel cell stack on the vehicle.

BACKGROUND ART

A fuel cell vehicle which a fuel cell stack is mounted has been proposed recently. In the fuel cell vehicle, the fuel cell stack is fixed to a vehicle frame via a mount structure.

CITATION LIST

Patent Literature

PTL 1: JP 2005-231549A

SUMMARY

Technical Problem

In the configuration that the fuel cell is fixed to the vehicle frame via the mount structure, the mount structure damps vibration to some extent. A large number of actuators such as pumps that may become vibration source are, however, placed in the periphery of the fuel cell stack. There is accordingly still a room for improvement with regard to reduction of noise and vibration (NV). Other needs with regard to the fuel cell vehicle include downsizing, cost reduction, resource saving and easy manufacture.

Solution to Problem

In order to solve at least part of the above problems, the invention may be implemented by any of the following aspects.

(1) According to one aspect of the invention, there is provided a fuel cell vehicle which a fuel cell stack is mounted on. This fuel cell vehicle may comprise a stack case that is configured to place the fuel cell stack therein; at least one mount structure that is configured to fix the stack case to a vehicle body; a rib that is provided to be along a path from a position adjacent to the mount structure across an upper surface of the stack case; and a damping member that is provided in a location that is at least part of the upper surface of the stack case other than a location area of the rib.

The fuel cell vehicle of this aspect has the advantageous effects of sufficiently damping the vibration while sufficiently reducing the noise by one of or a combination of some of;

i) providing the rib adjacent to the mount structure having high rigidity to increase the rigidity of the entire stack case;

ii) providing the rib on the stack case to divide the flat surface of the stack case into divisional surfaces of reduced areas; and iii) providing the damping member.

(2) in the fuel cell vehicle of the above aspect, the stack case may be fixed such that a stacking direction of a plurality of power generation cells included in the fuel cell stack is aligned with a vehicle width direction (left-right direction). The mount structure may be provided on at least one of a vehicle front side and a vehicle rear side of the stack case. The rib may be extended in a vehicle front-rear direction. In the fuel cell vehicle of this aspect, the mount structure is provided on at least one of the vehicle front side and the vehicle rear side of the stack case. This configuration reduces the total length of the stack case in the stacking direction of the fuel cell stack by the length of the mount structure, compared with a configuration that the mount structure is provided in the left-right direction of the stack case. This reduces the impact energy applied from a lateral direction in the case of, for example, a side collision. This configuration also ensures easy adaptation in the case of increasing the number of power generation cells stacked in the fuel cell stack.

(3) The fuel cell vehicle of the above aspect may comprise a plurality of the mount structures and a plurality of the ribs in pairs. Part of the plurality of mount structures may be provided on a vehicle front side of the stack case. A remaining part of the plurality of mount structures may be provided on a vehicle rear side of the stack case. This configuration enables the stack case to be stably placed on the vehicle body by means of the plurality of mount structures. Providing the plurality of mount structures enhances the rigidity of the stack case. This results in further reducing the noise and damping the vibration.

(4) In the fuel cell vehicle of the above aspect, the damping member may include at least an aluminum layer. Providing the rib shifts the resonance point of vibration of the stack case to the higher frequency. The configuration of the damping member to include the aluminum layer enhances the vibration damping effect at the high frequency. In other words, the vibration damping material using aluminum that serves to damp the vibration at the high frequency is employable for the damping member. This enhances the vibration damping effect at the high frequency. This configuration reduces the total weight, while further reducing the noise and damping the vibration.

(5) According to another aspect of the invention, there is provided a method of mounting a fuel cell stack on a fuel cell vehicle. This method of mounting may comprise providing a mount structure on an edge portion of a stack case configured to place the fuel cell stack therein, and providing a rib on an upper surface of the stack case along a vehicle front-rear direction to be extended from a position adjacent to the mount structure; providing a damping member in a location that is at least part of the upper surface of the stack case other than a location area of the rib; and fixing the stack case which the fuel cell stack is placed in to a vehicle body by means of the mount structure. Alternatively this method of mounting may comprise fixing a stack case which the fuel cell stack is placed in to a vehicle body by means of a mount structure; providing a rib to be extended from a position adjacent to the mount structure across an upper surface of the stack case; and providing a damping member in a location that is at least part of the upper surface of the stack case other than a location area of the rib. The method of mounting the fuel cell stack on the vehicle according to this aspect provides the advantageous effects of sufficiently reducing the noise while sufficiently damping the vibration, like the fuel cell vehicle of the above aspect (1).

DESCRIPTION OF EMBODIMENTS

The following describes embodiments of the invention.

A. Configuration

Figure 1:
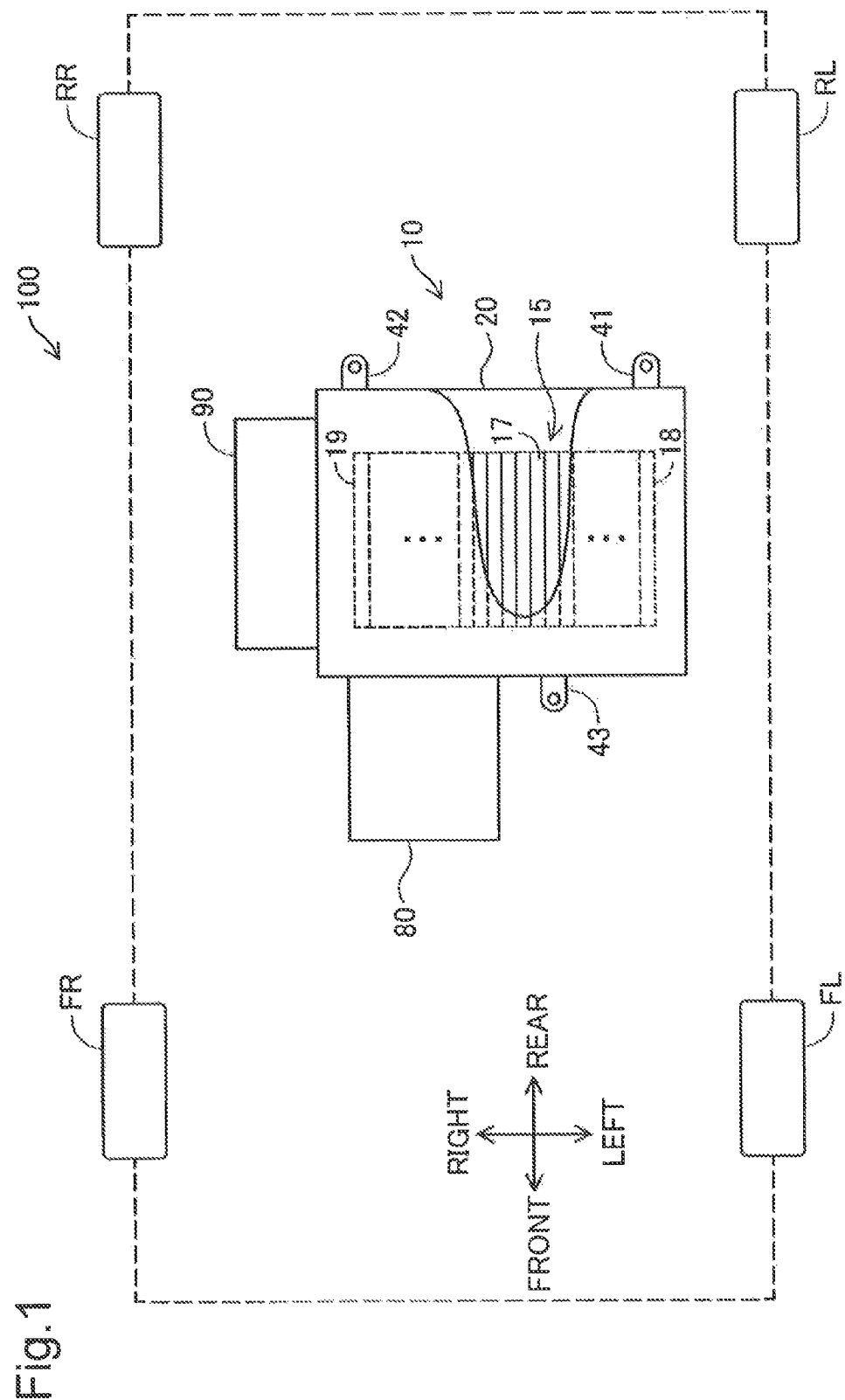
FIG. 1 is a diagram illustrating the general configuration of a fuel cell vehicle according to one embodiment of the invention.

FIG. 1 is a diagram illustrating the general configuration of a fuel cell vehicle according to one embodiment of the invention. The fuel cell vehicle 100 includes right and left front wheels FR and FL and right and left rear wheels RR and RL at four corners and has a fuel cell system 10 that is placed under the floor. Arrows "front, rear, left and right" in the illustration indicate directions determined on the basis of the fuel cell vehicle 100. In the description below, "front side", "rear side", "right side" and "left side" are based on the directions indicated by the arrows "front, rear, left and right". The left-right direction of the vehicle is also referred to as vehicle width direction.

The fuel cell system 10 includes a stack case 20 that is configured to place a fuel cell stack 15 therein, a converter case 80 that is configured to place a converter for fuel cell (not shown) therein, and an auxiliary machine cover 90 that is configured to place a fluid supply discharge unit (not shown). FIG. 1 illustrates the fuel cell stack 15 and its peripheries by breaking away part of the stack case 20. The number and the location of the fuel cell stack 15 placed in the stack case 20 in FIG. 1 are only illustrative. A plurality of the fuel cell stacks 15 may be placed in one stack case 20. The layout of the fuel cell stacks 15 in this application is not specifically limited. The fuel cell stacks 15 may be arrayed in the front-rear direction, may be arrayed in the left-right direction or may be arrayed in a diagonal arrangement. A stack case may be provided for each fuel cell.

The fuel cell stack 15 placed in the stack case 20 is a cell stacked body formed by stacking a plurality of unit fuel cells (power generation cells as minimum units of power generation) 17 and may be provided as, for example, a polymer electrolyte fuel cell. Each of the power generation cells 17 uses a fuel gas supplied from a fuel gas tank (not shown) mounted on the fuel cell vehicle 100 and the air supplied as an oxidizing gas from the periphery of the fuel cell vehicle to generate electric power. This embodiment employs hydrogen gas as the fuel gas.

The converter for fuel cell placed in the converter case 80 is a voltage converter (DC-DC converter) configured to boost up the electric voltage supplied from the fuel cell stack 15. The electric voltage boosted up by the converter is output to a drive motor (not shown) included in the fuel cell vehicle 100. The vehicle 100 of this embodiment is a front-drive vehicle, so that the front wheels FR and FL are driven and rotated by the drive motor.

The fluid supply discharge unit placed in the auxiliary machine cover 90 includes various pipes for fuel gas, oxidizing gas and cooling medium and actuators such as pumps and injectors connecting with the pipes. The actuators such as pumps and injectors may become a vibration sources during operation.

The stack case 20 of this embodiment is laterally arranged such that the stacking direction of the plurality of power generation cells 17 in the fuel cell stack 15 is approximately aligned with the left-side direction of the fuel cell vehicle 100 (vehicle width direction). The converter case 80 is linked with the stack case 20 to be located on the front side of the stack case 20. The auxiliary machine cover 90 is linked with the stack case 20 to be located on the right side of the stack case 20. The stack case 20, the converter case 80 and the auxiliary machine cover 90 are metal (for example, aluminum) cast products.

Figure 2:
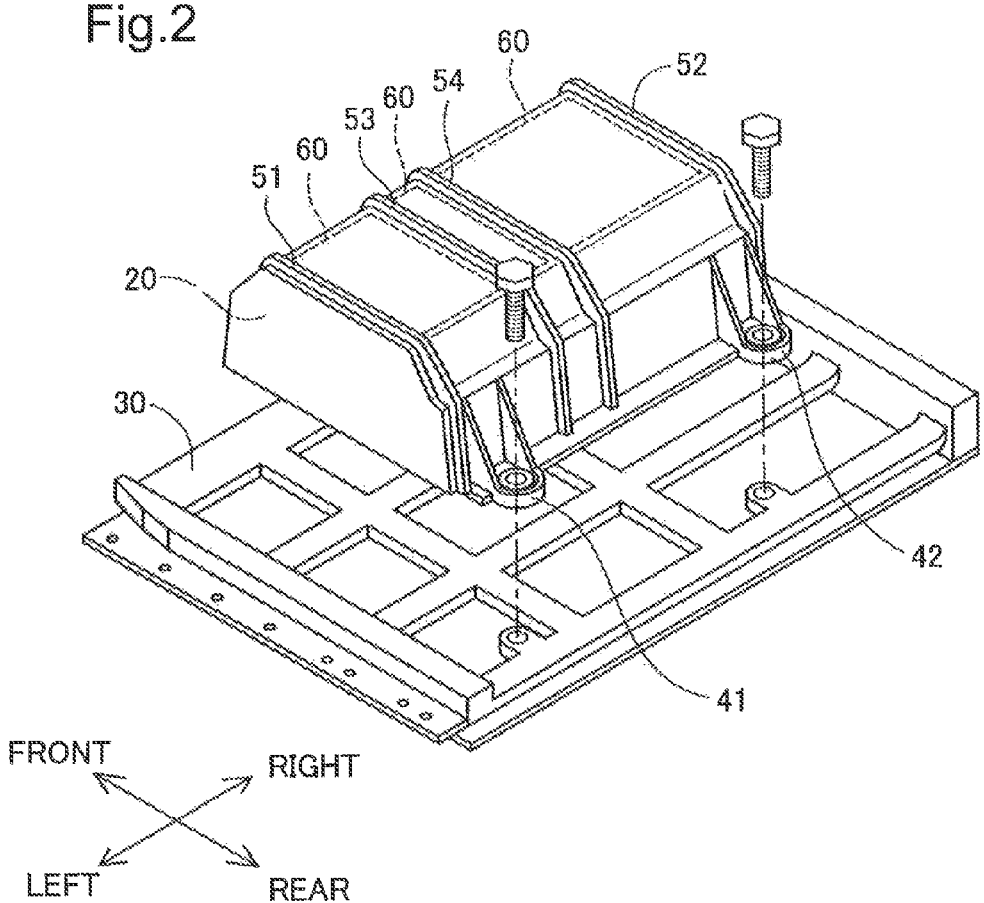
FIG. 2 is an exploded perspective view illustrating the state that a stack case is mounted on the fuel cell vehicle.

FIG. 2 is a diagram illustrating the state that the stack case 20 is mounted on the fuel cell vehicle. As illustrated, the stack case 20 is fixed on a stack frame 30. The fuel cell vehicle 100 is configured by fastening and holding a body (not shown) and a vehicle body frame (not shown) to each other. The stack frame 30 is fixed to the vehicle body frame. As a result, the stack case 20 is fixed to the vehicle body. According to this embodiment, the stack case 20 is fixed to the stack frame 30 by means of three mounts 41, 42 and 43 (the mount 43 is shown in FIG. 4).

Figure 3:
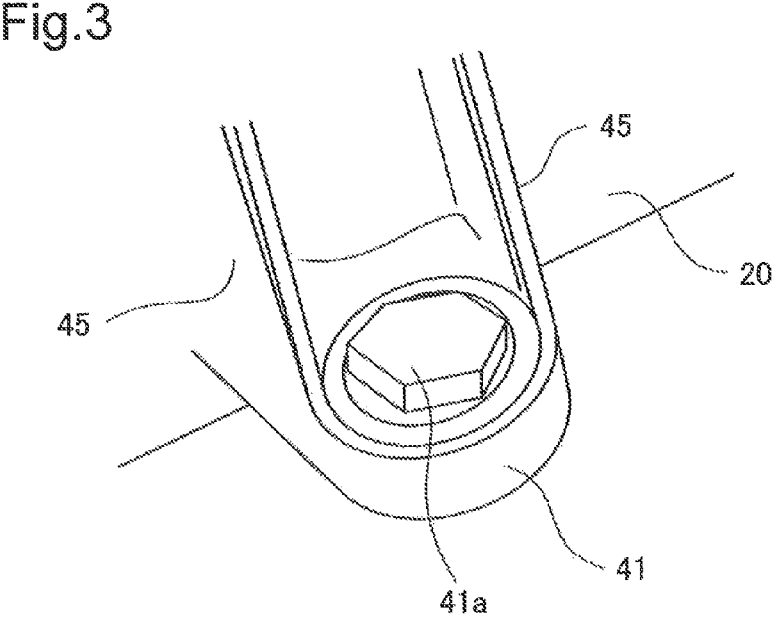
FIG. 3 is a perspective view illustrating periphery of a mount.

FIG. 3 is a perspective view illustrating the periphery of the mount 41 on the vehicle left side. As illustrated, the mount 41 is formed in a shape protruded from a lower end of the stack case 20 and includes a hole (not shown). A mount bolt 41a is inserted and screwed to this hole, so that the stack case 20 is fixed to the stack frame 30 (shown in FIG. 2). More specifically, the mount 41 is configured such that an elastic body (for example, rubber, not shown) is placed between the hole and the mount bolt 41a. The elastic body serves to damp the vibration. The other mounts 42 and 43 out of the three mounts 41 to 43 have configurations similar to that of the mount 41. According to this embodiment, the respective mounts 41, 42 and 43 and members provided for the respective mounts 41, 42 and 43 (mount bolts, elastic bodies and ribs for reinforcement) are included in the subordinate concept of the "mount structure" described in Summary. The elastic body may be an insulating elastic body to insulate the mount bolt 41a from the hole.

Figure 4:
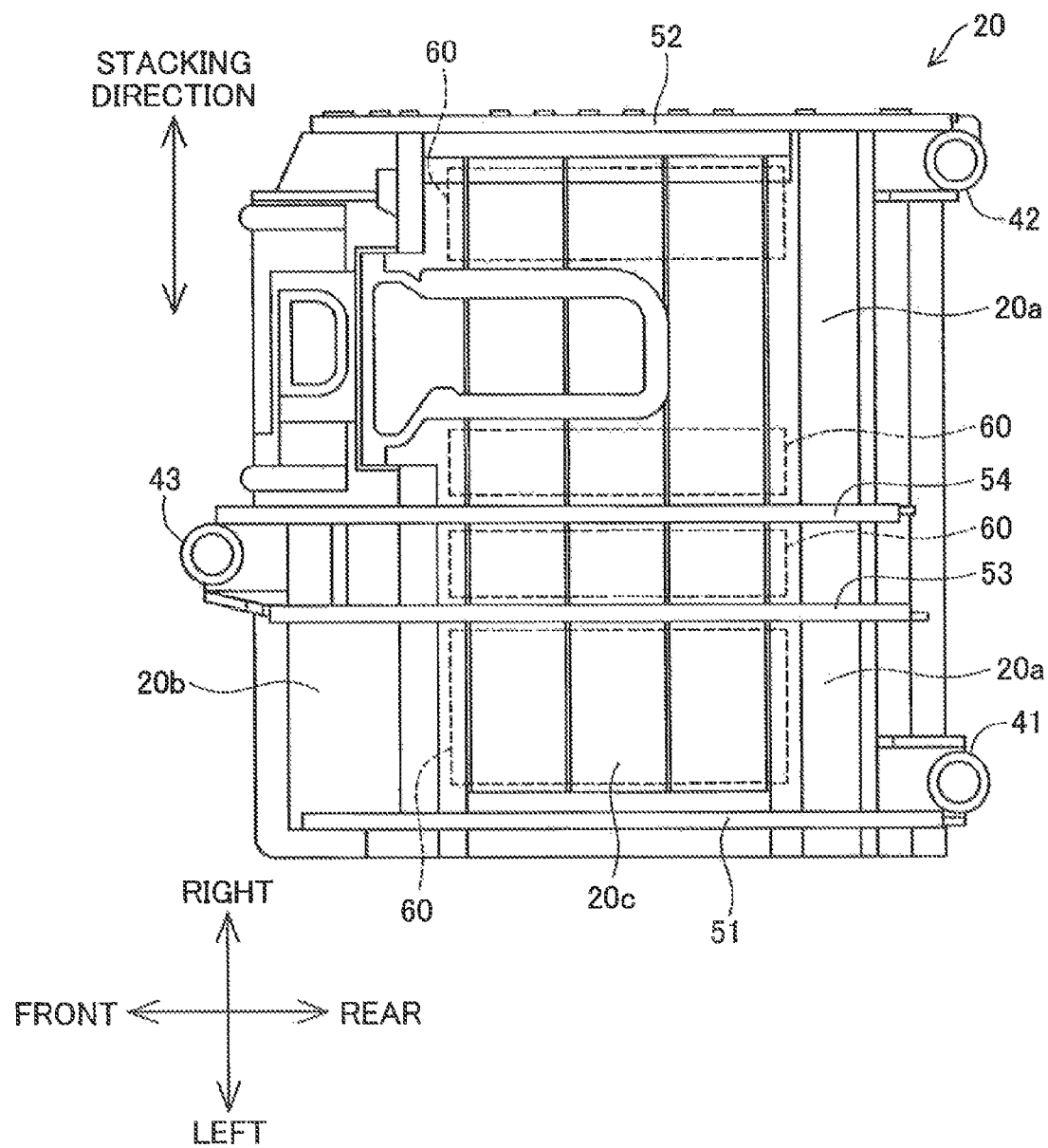
FIG. 4 is a plane view illustrating the stack case.

FIG. 4 is a plan view illustrating the stack case 20. As illustrated, the two mounts 41 and 42 out of the three mounts 41 to 43 are provided on the rear side of the stack case 20, and the last one mount 43 is provided on the front side of the stack case 20. The mount 41 as one of the rear side mounts is located near to a left end in a lower portion of a rear wall surface 20a of the stack case 20. The mount 42 as the other of the rear side mounts is located near to a right end in the lower portion of the rear wall surface 20a of the stack case 20. The mount 43 on the front side is located on the left side of the center in the left-right, direction in a lower portion of a front wall surface 20b of the stack case 20. This configuration prevents the mount 43 from interfering with the converter case 80 that is located on the front side of the stack case 20.

First to fourth ribs 51, 52, 53 and 54 for reinforcement are provided on an upper surface 20c of the stack case 20. The "upper surface" herein denotes a surface that faces up. When there are a plurality of surfaces that face up, the "upper surface" denotes a surface most parallel to a mounting surface of the stack case among the plurality of surfaces. More specifically, the first rib 51 is extended forward from a left adjacent position of the mount 41 on the rear left side to be stretched from the rear wall surface 20a through the upper surface 20c to the front wall surface 20b. The second rib 52 is extended forward from a right adjacent position of the mount 42 on the rear right side to be stretched from the rear wall surface 20a through the upper surface 20c to the front wall surface 20b. The third and fourth ribs 53 and 54 are extended rearward from both adjacent positions of the mount 43 on the front side to be stretched from the front wall surface 20b through the upper surface 20c to the rear wall surface 20a. The fuel cell stack 15 placed in the stack case 20 has end plates 18 and 19 that are located on respective ends in the stacking direction of the power generation cells 17. The location where the first rib 51 is placed is near to a left end of the stack case 20. The location where the second rib 52 is placed is near to a right end of the stack case 20. Accordingly, the locations of the first rib 51 and the second rib 52 are approximately aligned with the locations of the respective end plates 18 and 19 in the left-right direction of the fuel cell vehicle 100.

Damping members 60 are respectively placed between the first rib 51 and the third rib 53, between the third rib 53 and the fourth rib 54 and between the fourth rib 54 and the second rib 52 on the upper surface of the stack case 20. According to this embodiment, the damping member $0 is configured by applying a sheet made of aluminum (aluminum sheet) on butyl rubber and is bonded between each adjacent pair of the ribs 51 to 54 by using a butyl rubber-side surface as its bonding surface.

The converter case 80 is fixed to the vehicle body frame by means of mounts similar to the mounts 41 to 43 for fixing the stack case 20. The auxiliary machine cover 90 is not directly fixed to the vehicle body frame but is linked with and fixed to the stack case 20. Mounts for fixing the converter case 80 and a linkage structure of the auxiliary machine cover 90 are omitted from the illustration.

B. Functions and Advantageous Effects

In the fuel cell vehicle 100 having the configuration described above, the first to the fourth ribs 51 to 54 are provided adjacent to the mounts 41 to 43 having high rigidity. This configuration increases the rigidity of the entire stack case 20. Providing the first to the fourth ribs 51 to 54 divides the flat surface of the stack case 20 into divisional surfaces of reduced areas, thus enhancing the vibration damping effect. The damping members 60 are additionally provided between the respective adjacent pairs of the ribs 51 to 54. This further enhances the vibration damping effect. One of these technical features or a combination of some of these technical features provides the advantageous effects of sufficiently reducing noise while damping the vibration. In the fuel cell vehicle 100, the first to the fourth ribs 51 to 54 are provided on the stack case 20. This configuration shifts the resonance frequency of vibration of the stack case 20 to the higher frequency. The damping members 60 provided between the first to the fourth ribs 51 to 54 are made from the material including an aluminum sheet. This further enhances the vibration damping effect at the high frequency. In other words, the vibration damping material using aluminum that serves to damp the vibration at the high frequency is employable for the damping members 60. This enhances the vibration damping effect at the high frequency. This configuration reduces the total weight, while further reducing the noise and damping the vibration.

Additionally, in the fuel cell vehicle 100, each of the mounts 41 to 43 configured to fix the stack case 20 to the stack frame 30 is provided on the front side or the rear side of the stack case 20. This reduces the total length of the stack case in the stacking direction of the fuel cell stack 15. This configuration avoids the impact energy from being applied from a lateral direction in the case of a side collision or the like. This configuration also eliminates the need to change the locations of the mounts 41 to 43 even in the case of an increase in number of cells stacked in the fuel cell stack 15 and thereby ensures easy adaptation in this case.

C. Modifications

Modification 1

According to the above embodiment, the mount structure is configured to include the mount, mount bolt, insulating elastic body and rib for reinforcement. The mount structure of the invention may not, however, necessarily be configured to include all these components. One modified configuration may omit the rib for reinforcement. Another modified configuration may omit the insulating elastic body and the rib for reinforcement. Additionally, the mount structure may be configured to use a member in another shape, for example, a rivet, to fix the stack case to the vehicle body. The plurality of mounts may not be necessarily formed in an identical shape but may be formed in different shapes according to the locations and the materials of the respective mounts.

Modification 2

According to the above embodiment, the stack case 20 is fixed to the stack frame 30, and the stack frame 30 is fixed to the vehicle body frame, so that the stack case 20 is fixed to the vehicle body. The invention is, however, not limited to this configuration. For example, the stack case may be directly fixed to the vehicle body frame. In another example, the stack frame may be fixed between two side frames. In other words, any configuration that fixes the stack case to the vehicle body may be employed.

Modification 3

The above embodiment employs the three mount structures to fix the stack case to the vehicle body. The number of mount structures is, however, not limited to three but may be any other number, for example, one, two or four. According to the above embodiment, the ribs are provided for all the mount structures used to fix the stack case to the vehicle body. According to a modification, the rib may be provided for only part of the mount structures. One modified configuration of the above embodiment may omit at least one of the third rib 53 and the fourth rib 54 provided for the mount 43. Another modified configuration of the above embodiment may omit at least one of the first rib 51 and the second rib 52 respectively provided for the mounts 41 and 42.

Modification 4

According to the above embodiment, the damping members 60 are provided between the respective adjacent pairs of the ribs 51 to 54. The damping members may, however, not necessarily be provided between all the adjacent pairs of ribs. For example, in a configuration having one rib in the stack case, a damping member may be provided besides the rib. The location range of the damping member may be, for example, a configuration that the damping member is spread to fully cover an area between adjacent ribs or a configuration that the damping member is spread to cover part of a surface other than the location area of a rib. In other words, the damping member may be provided in any location that is at least part of the upper surface of the stack case other than the location area of a rib. Ribs and damping members may be placed not only on the upper surface of the stack case but on side faces such as front face and rear face of the stack case.

Modification 5

According to the embodiment, the damping member 60 is configured by applying an aluminum sheet on butyl rubber, i.e., configured to include a butyl layer and an aluminum layer. According to modifications, the damping member 60 may be configured to include only the butyl layer or may be configured to include a resin layer in place of the aluminum layer. In other words, the damping member 60 may have any of various configurations including at least, the butyl layer. Any elastic material other than butyl, for example, silicone rubber or a foam may be used for the damping member 60.

Modification 6

The embodiment and each of the modifications described above employs a polymer electrolyte fuel cell for the fuel cell. The invention is, however, applicable to various fuel cells, for example, phosphoric acid fuel cell, molten carbonate fuel cell and solid oxide fuel cell.

The invention is not limited to any of the embodiment and the modifications described above but may be implemented by a diversity of other configurations without departing from the scope of the invention. For example, the technical features of any of the embodiment and modifications corresponding to the technical features of each of the aspects described in Summary may be replaced or combined appropriately; in order to solve part or all of the problems described above or in order to achieve part or all of the advantageous effects described above. Among the components in any of the embodiment and the modifications described above, the components other than those described in independent claims are additional components and may be omitted as appropriate.

INDUSTRIAL APPLICABILITY

The aspects of the invention are applicable as a fuel cell vehicle which a fuel cell stack is mounted on and a method of mounting the fuel cell stack on the fuel cell vehicle.

REFERENCE SIGNS LIST

10 fuel cell system
15 fuel cell stack
17 power generation cell
18, 19 end plates
20 stack case
20a, 20b wall surfaces
20c upper surface
30 stack frame
41-43 mounts
51-54 first to fourth ribs
60 damping member
80 converter case
90 auxiliary machine cover
100 fuel cell vehicle
FR, FL front wheels
RR, RL rear wheels

The invention claimed is:

1. A fuel cell vehicle which a fuel cell stack is mounted on, the fuel cell vehicle comprising:
    a stack case that is configured to place the fuel cell stack therein;
    at least one mount structure that is configured to fix the stack case to a vehicle body;
    a rib that is provided to be along a path from a position adjacent to the mount structure across an upper surface of the stack case; and
    a damping member that is provided in a location that is at least part of the upper surface of the stack case other than a location area of the rib, the damping member being configured to suppress mechanical vibration.

2. The fuel cell vehicle according to claim 1,
    wherein the stack case is fixed such that a stacking direction of a plurality of power generation cells included in the fuel cell stack is aligned with a vehicle width direction,
    the mount structure is provided on at least one of a vehicle front side and a vehicle rear side of the stack case, and
    the rib is formed along a vehicle front-rear direction.

3. The fuel cell vehicle according to claim 2,
    the fuel cell vehicle comprising a plurality of the mount structures and a plurality of the ribs in pairs, wherein
    part of the plurality of mount structures is provided on a vehicle front side of the stack case, and
    a remaining part of the plurality of mount structures is provided on a vehicle rear side of the stack case.

4. The fuel cell vehicle according to claim 1,
    wherein the damping member includes at least a butyl layer.

5. A method of mounting a fuel cell stack on a fuel cell vehicle, comprising:
    providing a mount structure on an edge portion of a stack case configured to place the fuel cell stack therein, and providing a rib on an upper surface of the stack case along a vehicle front-rear direction to be extended from a position adjacent to the mount structure;
    providing a damping member in a location that is at least part of the upper surface of the stack case other than a location area of the rib, the damping member suppressing mechanical vibration; and
    fixing the stack case which the fuel cell stack is placed in to a vehicle body by means of the mount structure.

* * * * *